W. SCHULZ.
FLEXIBLE METALLIC JOINT.
APPLICATION FILED DEC. 19, 1918.
1,315,610.
Patented Sept. 9, 1919.
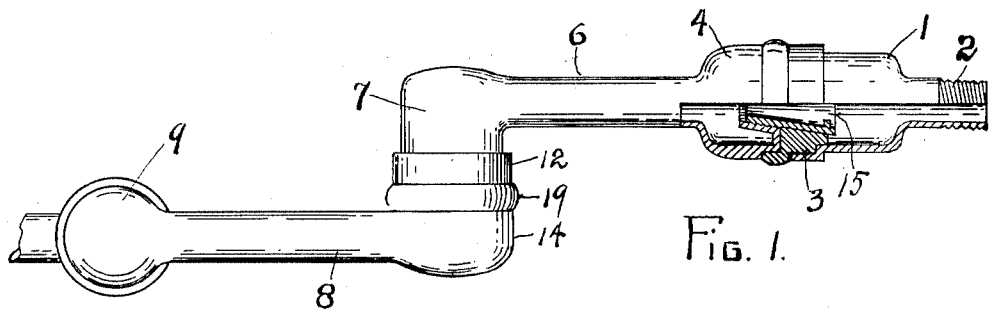
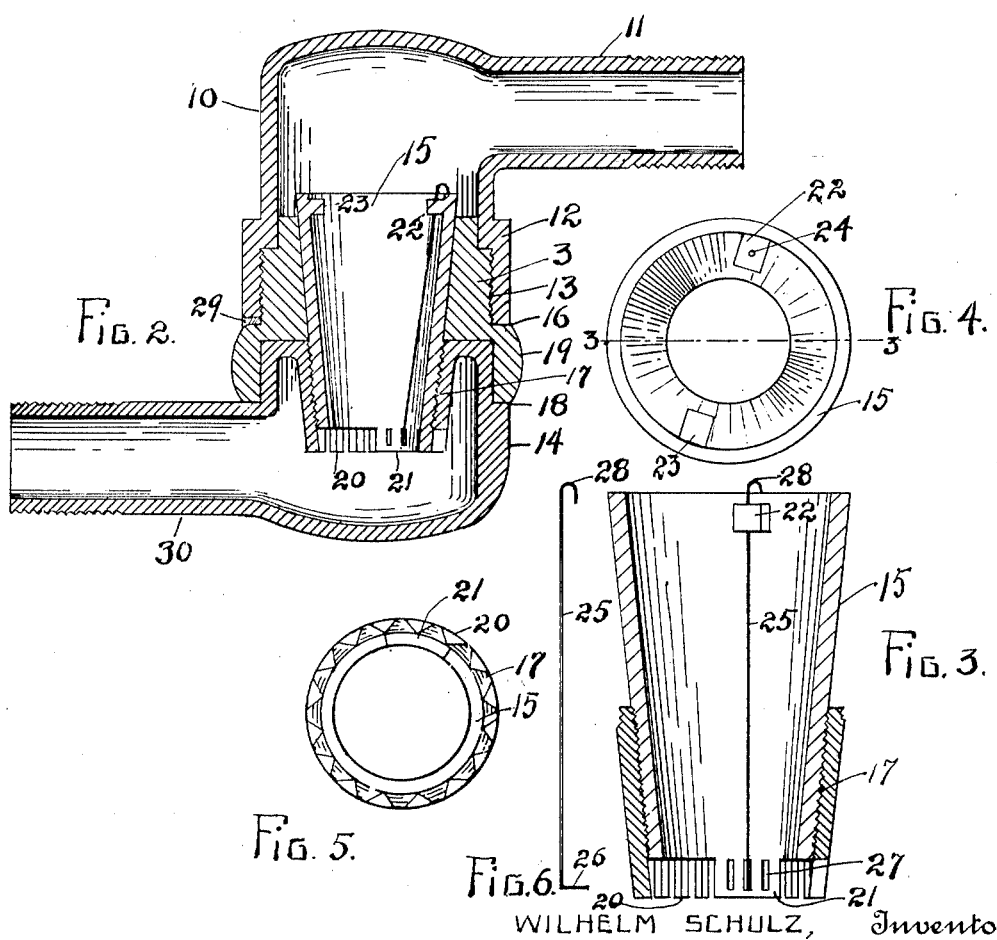
WILHELM SCHULZ, Inventor
By Jesse R. Stone
Attorney

UNITED STATES PATENT OFFICE.

WILHELM SCHULZ, OF HOUSTON, TEXAS.

FLEXIBLE METALLIC JOINT.

1,315,610.   Specification of Letters Patent.   Patented Sept. 9, 1919.

Application filed December 19, 1918. Serial No. 267,475.

*To all whom it may concern:*

Be it known that I, WILHELM SCHULZ, a citizen of the United States, residing at Houston, Harris county, Texas, have invented a certain new and useful Flexible Metallic Joint, of which the following is a full, clear, and exact description, such as will enable others skilled in the art to which it appertains to make and use the same.

My invention relates to metallic train pipes and more especially to improvements in flexible joints and couplings for use in the construction of connections between adjacent cars and is an improvement on the invention disclosed in my prior Patent No. 856,427 issued June 11, 1907.

In my invention I contemplate the use of metallic pipes alone for conveyance of fluid from car to car, thereby doing away with the customary hose of rubber or fabric composition at present used for this purpose in train connections.

One object of my present improvement is to form a metallic joint which will allow rotation about the said joint and be capable of adjustment so as to maintain a tight closure at all times.

Another object is to provide a metallic joint for pipes which will allow play in all directions in the same manner as do the customary flexible hose.

Another object is to provide a metallic joint which will be tight at all times and in which the pressure of the fluid through the pipe will only serve to tighten the joint.

Another object is to provide a means to secure the parts of a flexible metallic joint in position in such manner that they will not be easily unscrewed.

Other objects of my invention will more clearly appear in the description which follows and will be more definitely set forth in the claims hereto appended.

Reference may now be had to the accompanying drawings forming a part of this specification in which similar characters of reference indicate corresponding parts in each of the several views. Figure 1 is a view of several sections of metallic pipe joined together in the manner contemplated in my invention. Fig. 2 is a longitudinal section through one of the flexible joints of my train pipe connection. Fig. 3 is a longitudinal section showing the conical connecting member of my joint, said view being taken on the line 5—5 of Fig. 4. Fig. 4 is a top plan view of the conical member shown in Fig. 3. Fig. 5 is a view showing the lower face of the construction shown in Fig. 3. Fig. 6 is a view of the locking means for preventing accidental loosening of the joint.

The flexible metallic joint which forms the subject of my invention is designed especially for use on connections between the pipes conducting air, steam or water from one car to another on railway trains. In Fig. 1, the pipe 1 is designed to be attached at the threaded end 2 to one of the pipes installed in a car. This section is pivoted through an intermediate retaining bearing member 3 and a connecting sleeve to a second section of pipe 6, provided with a head 4. The manner in which the head 4 is connected to the retaining member 3 constitutes the principal subject of my invention and will be later described. As arranged in Fig. 1, my flexible joint allows rotation of the head 4, on a longitudinal axis upon the bearing member 3, connected with the section 1, which in turn is connected with the train pipe, not shown. The head 4 is formed upon one end of a pipe 6, having a head 7 at the other end bent laterally to make a pivotal joint with another pipe 8 similar to that previously described. This joint, as will be obvious, allows play in a lateral direction. At the opposite end of the section 8 is another joint 9, so arranged to allow play in a vertical direction.

With special reference to Fig. 2 the detail construction of my improved joint will now be described. The pipe designated at 11 is provided with an elbow 10 which is threaded interiorly at its open end 12 for attachment to the intervening bearing member 3. This bearing member is a hollow sleeve threaded exteriorly at 13 for attachment to the part 12 of the elbow but extending below the said elbow to encircle the coöperating head portion 14 of another section of pipe 30. A shoulder 16 is provided at the end of the threaded portion 13 to limit the downward movement of the elbow 10 thereon, thus serving to form a tight closure at that point. The inner surface of the bearing member 3 is tapered inwardly toward the lower end to receive a frusto-conical connecting sleeve 15. Said sleeve 15 is also tapered downwardly and threaded at its lower end for attachment within the seat 17 on the head 14 of the coöperating pipe 15.

Said head 14 has an exterior shoulder 18 against which the bearing member 3 is adapted to contact. The upper face of the elbow 14 is bent inwardly and recurved downwardly to form the seat 17 within which the connecting sleeve 15 is threaded. The lower annular face of the seat 17 is toothed as shown at 20, these teeth being spaced slightly apart and approximately triangular in shape. One of the vertices of the triangles being presented inwardly as shown particularly in Fig. 5. These teeth coöperate with openings in a downward extension 21 upon the connecting sleeve 15 for the purpose of locking the connecting sleeve 15 against accidental loosening. Toward the upper end of the connecting sleeve 15, I have provided two inwardly projecting lugs 22, 23 for the purpose of furnishing a means by which a wrench may be used to tighten or untighten the sleeve 15 within the seat 17. The lug 22 is provided with an opening 24 therethrough to accommodate a locking wire or rod 25 which has an elbow 26 at the lower end thereof, the lateral extension of which is adapted to pass through one of several elongated openings 27 in the lower end of the extension 21 upon the sleeve 15, and between two of the teeth 20 on said seat.

In the operation of my device the parts are assembled approximately as shown in Fig. 1, the end 2 thereof being threaded into the end of a pipe coupling connecting the same with the train pipe, not shown. The other end of the jointed pipe, shown broken off in Fig. 1, is provided with the ordinary coupling head, not shown, but which is now in general use on pipe connections. The sections shown at 6 and 8 may each be made in one piece as shown in Fig. 1, or may be constructed in two separate sections connected together by a pipe coupling in the ordinary manner, as suggested in Fig. 2. This, being a common expedient now in general use, is not further illustrated.

The joints are assembled in the following manner: The connecting member 15 is placed within the tapering seat in the bearing member 3 which is then placed upon the open end of the head 14 of the pipe 30. A wrench is then used to grip the lugs 22 and 23 and to thread the connecting sleeve 15 firmly within the seat 17. The locking wire 25 is then passed through the opening in the lug 22 and inserted downwardly so that the laterally turned portion of the elbow 26 will pass through any of the openings 27 in the extension 21 on the connecting sleeve. It is desired that the part 26 be inserted through one of the openings 27 and passed between certain of the teeth 20 upon the seat 17. If one of the openings 27 should be so registered in position as not to allow the locking wire 25 to pass through the same, the wire could be inserted in either of the other holes 27 and one place would be found where the wire would pass between the teeth 20. The triangular shape of the teeth 20 makes it possible to direct the wire between the same with very little difficulty. When the wire has been thus set it is drawn upwardly and the top portion 28 is bent over as shown in the drawing so as to prevent the wire from again dropping back and becoming accidentally loosened. It is obvious that other means of locking the sleeve 15 against accidental unscrewing may be used such as a set screw passing through one of the openings in the lower end of the extension 21, or by any other numerous obvious expedients, and I do not wish to confine myself to the locking means shown herein. When the parts 3, 15 and 17 have been thus firmly locked together the head 10 of the pipe 11 is then screwed down over the threaded portion 13 of the bearing member 3. When properly tightened in position the lower end 12 of the head 10 will contact at 16 with the shoulder of the bearing member 3. A set screw 29 may then be used to secure the head 10 upon the bearing member 3 so that the same may not be accidentally loosened. This set screw 29 is adapted to be threaded into the lower face 12 of the head 10 at the point where the same contacts with the shoulder 16 and partly into a seat in the bearing member 3 as shown in Fig. 2. It will thus be obvious that lateral rotation of the pipe 11 on the bearing member 3 will be prevented.

By inspection it will be seen that this joint is a firm and tight joint. The inner face of the bearing member 3 serves as a surface of rotation, this surface bearing against the outer face of the connecting sleeve 15 and the upper face of the head 14 of the pipe 30. This type of joint will be self tightening to the extent that pressure within the pipe tending to force the elbow 10 in one direction and the elbow 14 in the opposite direction will only serve to force the tapering connecting member 15 more firmly into its seat within the bearing member 3. Pressure laterally within the connecting member 15 would only serve to press the same outwardly within its seat in the same manner.

In order to provide a surface on the bearing member 3 for seizure by a pipe wrench or other similar device, to hold the same stationary while the head 10 is screwed or unscrewed from the same, the lower portion 19 thereto is rounded outwardly beyond the line of the adjacent pipe as shown in Figs. 1 and 2. Thus, when the joint is to be taken apart, the set screw 29 is removed and a pipe wrench or other device is gripped about the rounded portion 19 of the bearing member and the head 10 is then rotated to unscrew the same from the bearing member.

The connecting member 15 may then be removed in an obvious manner without further difficulty.

Although I have described my invention as particularly applicable to train pipe connections, it is obvious that it could be used in other installations and I do not wish to confine myself to any particular use for the said joint. The use of the flexible pipe for train pipe connections will increase the life of such connecting members over the usual rubber hose, now generally used. It will avoid accidents due to bursting so common with the ordinary rubber hose and will result in safety and economy.

Having thus described my invention, the uses and advantages of which will be obvious without further description what I claim as new and desire to protect by Letters Patent is:

1. A flexible joint for metallic pipes comprising an enlarged head on each pipe, a bearing sleeve threaded within one pipe and fitting rotatably over a second pipe, a recurved tapered seat on said last named pipe and a frusto-conical connecting sleeve fitting within said bearing sleeve and threaded at its smaller end within said seat.

2. A flexible joint for metallic pipes including an enlarged head upon each pipe, a bearing member threaded within one head and a connecting member fitting in said bearing member and secured within the head of the coöperating pipe, and serving to retain said pipes rotatably together.

3. A flexible joint for metallic pipes comprising an enlarged head on each pipe, a bearing member threaded within one head and fitting rotatably upon a seat on the head of the second of said pipes, said second pipe having a re-curved face, a connecting member threaded within the recurved face of said second pipe and fitting rotatably within the said bearing sleeve and means to lock the threaded members against accidental loosening.

4. A flexible joint for metallic pipes comprising a bearing sleeve threaded within the end of one pipe, the inner face of said bearing sleeve being tapered throughout, a frusto-conical connecting sleeve fitting rotatably within said bearing sleeve and attached to the open end of a second pipe, said bearing sleeve fitting rotatably over the coöperating end of said second pipe, and held thereon by said connecting sleeve.

5. A flexible joint for metallic pipes comprising a bearing sleeve threaded within one pipe, a frusto-conical connecting sleeve fitting within said bearing sleeve and attached to the end of a second pipe and the means for locking the connecting sleeve within said second pipe comprising a downwardly projecting lug on said sleeve, said lug having openings therein, coöperating teeth on the threaded seat on said second pipe and a locking wire adapted to pass through said opening and between said teeth.

6. A flexible joint for metallic pipes comprising a bearing sleeve on the end of one pipe, a second pipe, a tapered seat in said bearing sleeve, a frusto-conical connecting sleeve adapted to fit rotatably in said seat and hold said pipes together, and means for securing said connecting sleeve to the end of said second pipe.

7. In a flexible joint for metallic pipes, an interiorly threaded end on one pipe, a bearing member threaded within said end, a frusto-conical connecting sleeve fitting rotatably in said member, a second pipe having a flat outer face and recurved threaded seat adapted to receive said sleeve and means to lock said sleeve in said seat.

In testimony whereof, I hereunto affix my signature this the 14th day of December, A. D. 1918.

WILHELM SCHULZ.